Figure 1:
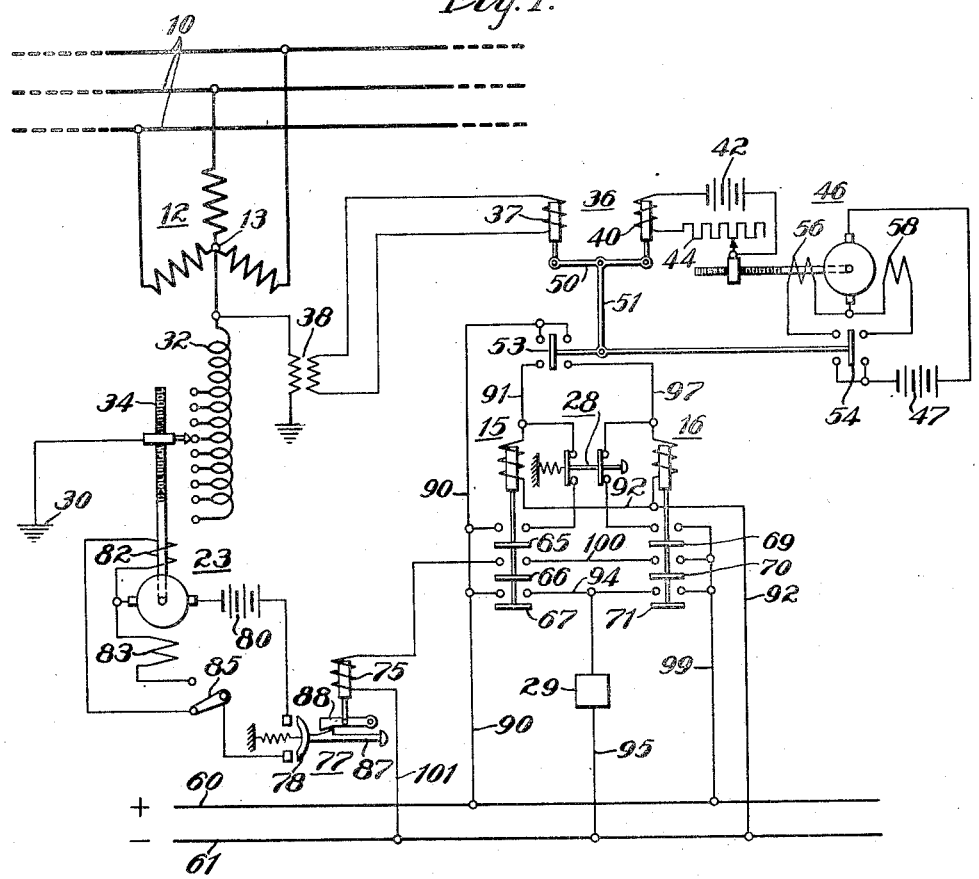

Jan. 2, 1934.  P. HAMEYER ET AL  1,942,285

AUTOMATIC ADJUSTING SYSTEM

Filed Dec. 28, 1932   2 Sheets-Sheet 1

INVENTORS
Paul Hameyer,
Gerhart Meyer and
Joachim Jungmichl.
BY Franklin E. Hardy
ATTORNEY Patented Jan. 2, 1934

1,942,285

UNITED STATES PATENT OFFICE 1,942,285

AUTOMATIC ADJUSTING SYSTEM

Paul Hameyer, Hanover, Gerhart Meyer, Dresden-Radebeul, and Joachim Jungmichl, Berlin-Steglitz, Germany, assignors to Westinghouse Electric & Manufacturing Company, East Pittsburgh, Pa., a corporation Application December 28, 1932, Serial No. 649,136, and in Germany December 29, 1931

10 Claims. (Cl. 172—237)

Our invention relates to ground-fault arc-suppressing systems for alternating-current transmission and distribution circuits utilizing neutral-grounding inductors and has particular relation to means for effecting a proper adjustment of the reactance of such inductors.

There are known arrangements of inductors in alternating-current electric systems which may be made effective to suppress or neutralize the leakage or fault charging current to ground which flows upon the formation of an arc between a conductor and ground. Such reactors or inductors are frequently referred to, by those skilled in the art, as earthing coils or arcing ground suppressors. As is known, the function of a neutral-grounding reactor is to neutralize the leading fault current, that is, the capacitance current to ground of the ungrounded portion of the system being protected, by permitting a lagging current to pass from the system neutral point to ground upon the occurrence of an accidental grounding of one of the system conductors. To suppress the earth current at the point of breakdown, and thus extinguish the arc, it is necessary that this neutral inductive current be substantially equal in magnitude to the capacitance current.

There is considerable practical difficulty in adjusting such inductors to have the value of reactance necessary to extinguish the earth fault arc. This difficulty arises from the fact that in the past it has been difficult to determine the accuracy of such adjustment without resorting to elaborate tests and complicated electrical measurements. Furthermore, the problem becomes increasingly complex when the number of circuits in the system being protected varies from time to time, which variation necessitates that the value of the reactance in the neutral grounding circuit be correspondingly changed to account for the different values of system capacitance to earth.

Our invention is directed to a means for maintaining system neutral grounding reactors at the proper adjustment, or tuning, and we contemplate for this purpose the use of a special relay system that is sensitive to variations from the most effective value of reactance, which relay system controls the operation of the reactance-adjusting means.

As is known, the capacitances of the individual phases to ground in a high-voltage circuit are more or less unequal. As a result of this inequality, the neutral point of the circuit will, in the case of circuits in which the neutral is not solidly grounded be caused to shift from the balanced position, thereby creating a potential difference between the neutral and ground. If, therefore, the neutral is grounded through an inductor, this inductor will carry a current the magnitude of which will depend upon the total impedance of a loop circuit which includes the inductor, the conductors of the high voltage circuit, the capacitance to ground of these conductors, and a return path through the ground to the inductor. Since the major portion of this impedance is comprised by the opposing reactances of the inductor and of the conductor capacitances, an adjustment of the inductor reactance will cause the current flowing through the loop circuit to vary through a wide range, the magnitude of this current being greatest when the inductor reactance is adjusted to be in resonance with and thus to balance the conductor capacitances to ground. This current sets up in the inductor a voltage drop which is directly proportional to it.

Consequently, as the reactance of the neutral grounding inductor is progressively changed, the shift of the neutral point, and therefore the voltage appearing between this point and ground, increases as the resonant or tuned condition is approached, and then decreases again after the resonant condition has been passed. As is known, such a resonant condition corresponds, in a ground-fault arc suppressing system of the type under consideration to the adjustment of the inductor which gives most effective arc suppression. In general, therefore, the resonant adjustment is the one desired, at which adjustment the neutral voltage to ground is a maximum value.

The absolute value of this neutral voltage, however, depends not only on the adjustment of the inductor but also upon other factors, such as the sag of the line conductors, plant growth near the conductors, etc. Therefore, the absolute value of neutral voltage cannot be an accurate indication of proper tuning, since the maximum attainable value under the circuit conditions then existing is the only true criterion.

In order to utilize this more accurate method of determining the most effective neutral reactance adjustment we contemplate, according to the present invention, the provision of a special relay system, as before mentioned, which system is effective to determine the value of inductance to yield the maximum value of the neutral point shift. The reactance of one of the neutral grounding inductors for the circuit being protected is then adjusted by a suitable means, the operation of which is dependent upon the above-mentioned relay system in such a manner that adjustment will be discontinued as soon as the value of the neutral voltage, changed by the said adjustment, has gone beyond the maximum value of which it is, under the particular conditions of the protected circuit, capable of attaining.

While the foregoing analysis has been made on the basis of a circuit the neutralpoint of which is grounded through but a single inductor, it will be apparent to those skilled in the art that very similar considerations also apply to circuits with which a plurality of neutral grounding inductors or other comparable compensating devices are utilized. The system of our invention about to be explained will therefore be seen to be applicable to situations in which any number of ground compensators are employed.

It is an object of our invention to provide means for increasing the effectiveness of neutral grounding devices for the suppression of earth leakage arcs in alternating-current systems.

More specifically, it is an object of our invention to provide, in systems of the type described, means for correcting for variations from the most effective value of neutral grounding reactance.

Another object of our invention is to provide a system of the type described which shall automatically control the tuning or adjustment of the neutral-grounding reactors.

Another object of our invention is to provide means for controlling a neutral grounding device to automatically compensate for changes in the capacitance to earth of the system with which it is utilized.

Figure 2:
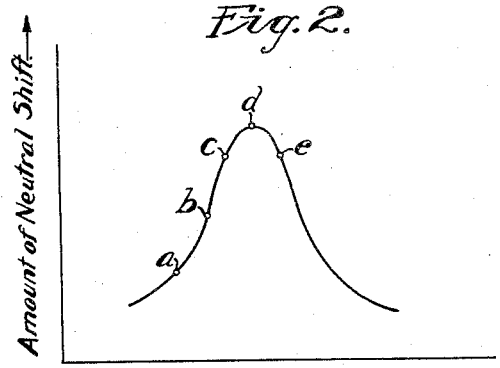
Figure 3:
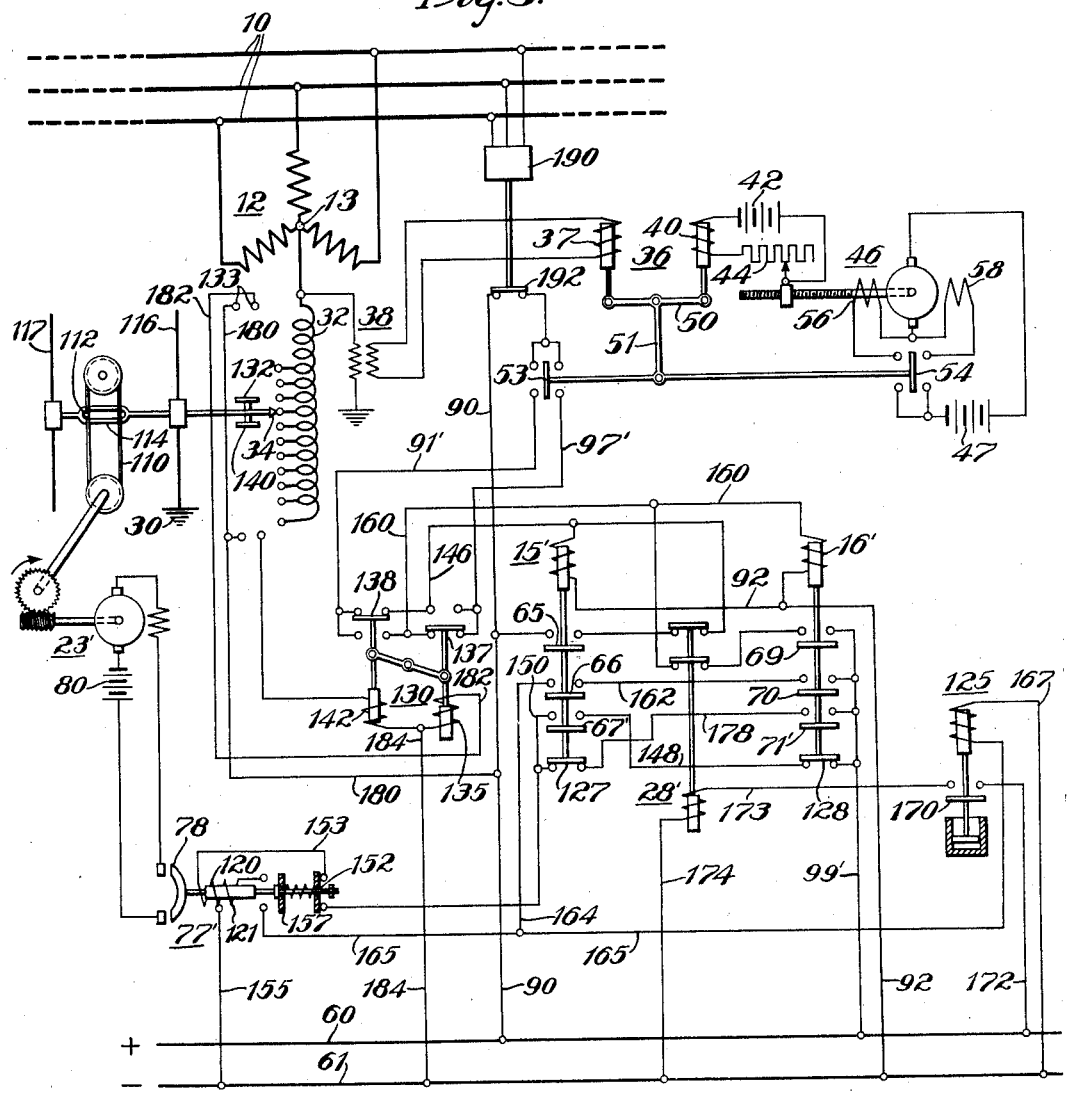

Our invention, together with additional objects and advantages thereof, will best be understood from the following description of specific embodiments, when read in conjunction with the accompanying drawings, in which Figure 1 is a diagrammatic view of apparatus and circuits utilized by one modification of our invention shown as being applied to a three-phase alternating-current system, which modification possesses semi-automatic characteristics;

Fig. 2 illustrates a curve showing the relation between compensating current or neutral grounding circuit reactance values and the magnitude of the neutral point shift; and Fig. 3 is a diagrammatic view of apparatus and circuits utilized in a second modification of our invention, which is arranged to be fully automatic in operation.

Referring to the drawings, and particularly to Fig. 1 thereof, the line conductors of a three-phase alternating-current system are illustrated at 10. Means for establishing an electrical neutral point 13 in the system is shown in the form of star-connected transformer windings 12. Between the neutral point 13 and ground 30, a grounding inductor 32 is connected in well known manner for the purpose of suppressing accidental ground-fault arcs that may occur between any of the three line conductors 10 and ground.

The inductor 32 is provided with a plurality of tap connections that are selectively engaged by a movable switching device 34, that is actuated by a motor 23. The switching device 34 is indicated schematically only. In practice it is desirable to utilize a device that will change the connections to the different taps without breaking the circuit to ground.

To provide means sensitive to the amount of neutral point shift, we utilize a differential relay 36 having two windings 37 and 40. One winding 37 is energized from a potential transformer 38 in accordance with the voltage existing between the system neutral point 13 and ground, and the other winding 40 is energized from a voltage source, such as the battery 42. The voltage applied to the winding 40 is varied by a rheostat 44 that is operated by a reversible motor 46 illustrated as energized from a battery 47.

The two windings 37 and 40 of the differential relay 36 exert upwardly acting forces upon the two plunger elements with which they are respectively associated. These plunger elements are attached to opposite ends of a pivotally mounted lever 50 which communicates its movement through a bellcrank member 51 to two sets of contact devices, which comprise, respectively, members 53 and 54. When the member 54 is moved to the left, it completes a circuit for energizing the motor 46 through the winding 56 to decrease the resistance of the rheostat 44 and when it is moved to the right, it similarly completes a circuit for energizing the motor 46 through the winding 58, thus causing the motor to move the rheostat in the opposite or resistance-increasing direction.

Similarly, when the contact member 53 of the differential relay 36 is moved to the left, it completes a circuit for energizing the actuating winding of an auxiliary relay 15, and when it is moved to the right, it completes a circuit for energizing the actuating winding of a second auxiliary relay 16, the two circuits last named deriving their energization from any suitable source of energy represented by the circuit conductors 60 and 61.

Each of the auxiliary relays 15 and 16 is provided with three normally open contact members 65, 66 and 67 for the relay 15, and 69, 70 and 71 for the relay 16. The contact members 65 and 69 are effective to close holding circuits for their respective relays, which circuits are completed through the contacts of a normally closed manually-operable control switch 28. Contact members 66 and 70 of the relays are connected in series with the energizing circuit for release or trip winding 75 of a control switch 77, which controls inductor-adjusting motor 23, while members 67 and 71 of the two relays serve to control the actuation of a signalling device 29, which may be in the form of a gravity drop, or other equivalent indicator.

As shown, the motor control switch 77 is of the manually closable type, it comprising a main contact member 78 which, when moved to the left, serves to connect the motor 23, through one or the other of two field windings 82 and 83, to a source of energization, represented by the battery 80. The selection of the field winding is made by a two-position switch 85 which determines the direction of rotation of the motor.

The contact member 78 of the switch 77 is normally biased to the open circuit position by means of a compression spring, and may be closed by manual movement of the plunger member 87 toward the right, in which closed position it is maintained by a latching device 88 which is releasable upon the energization of the previously mentioned trip winding 75.

The operation of the system shown in Fig. 1 is as follows. To effect a change in the adjustment of the compensating inductor 32, the switch 77 is closed manually, thereby causing the motor 23 to operate and effect a step-by-step adjustment in the reactance of the device 32. If, for example, the adjustment of the inductor corresponds to point $a$ on the curve in Fig. 2, which curve shows the relation between the neutral inductor reactance and the magnitude of the neutral shift, to which shift the neutral voltage to ground is directly proportional, and if the compensating current is increased by the adjustment of the inductor 32 resulting from the operation of motor 23, so that the shift of the neutral changes from point *a* to point *b* (Fig. 2), the energizing voltage applied to the winding 37 of the differential relay 36 correspondingly increases. This raises the upwardly-acting pull exerted by the winding 37 upon the left end of member 50 of the relay and causes the contact members 53 and 54 to be moved to the left. The contact member 54 closes a circuit that energizes the motor 46 to operate in a direction to increase the current supplied to the differential relay winding 40, which operation tends to restore the relay to its normal or equilibrium condition in which contact members carried thereby are again disengaged.

The contact member 53, when moved to the left-hand position completes an energizing circuit for the operating winding of the auxiliary relay 15, which circuit extends from control conductor 60, through conductor 90, contact member 53, conductor 91, the winding of relay 15, and conductor 92, back to control conductor 61.

Thus energized relay 15 moves to its circuit closing position, completing, through contact member 65, a holding circuit which maintains the relay energized until this circuit is opened by the manual operation of the control switch 28. The contact member 66 of the relay 15 closes one gap in, but does not complete an energizing circuit for the trip winding 75 of the motor control switch 77, and the contact member 67 completes an energizing circuit for the indicating device 29, which circuit extends from control conductor 60, through conductor 90, contact member 67, conductor 94, the indicating device 29, and conductor 95, back to the control conductor 61.

It may here be mentioned that the only purpose of the indicating device 29 is to show that the neutral point voltage in the circuit being protected has changed, which indication is of interest to an operator or attendant, in that it informs him that a change in the circuit or other conditions has taken place, and that a readjustment of the compensating inductor 32 should be made, which readjustment as has been mentioned, is initiated by the closure of control switch 77 in the circuit of inductor adjustment motor 23.

The motor 46 operates, as already pointed out, to increase the voltage applied to the winding 40 of the differential relay 36 until its pull balances that of winding 37. At the same time, the motor 23 is adjusting the reactance of the inductor 32 in a direction to further increase the compensating current, thereby causing the neutral voltage to ground, and the voltage impressed upon the winding 37 to increase from point *b* to point *c* and finally to point *d*, on the curve in Fig. 2. When the point *d* is reached, the desired adjustment of the compensating inductor 32 is realized, since that adjustment represents the maximum amount of neutral shift, or the most effective value of reactance for the inductor. Consequently, it is desired that the inductor adjusting motor 23, which is still operating be stopped, otherwise, this desired adjustment will be exceeded.

At point *d* on the curve in Fig. 2 the differential relay 36 returns to is illustrated, or open circuit position. The motor 23, however, continues to operate in a direction to increase the compensating current with the result that point *e* on the curve of Fig. 2 may be reached, at which point the voltage applied to the winding 37 of the relay 36 is decreasing. The upwardly acting pull exerted by the winding 40 now overbalances that of the winding 37, so that the contact members 53 and 54 are biased to the right.

The contact member 54 now completes a circuit through the field winding 58, for energizing the motor 46, thereby causing it to operate the rheostat 44 in the current-decreasing direction, which tends to restore the relay 36 to its central position. At the same time, the contact member 53 of the relay 36 completes a circuit for energizing the operating winding of the auxiliary relay 16, which circuit extends from the control conductor 60, through conductor 90, contact member 53, conductor 97, the winding of relay 16, and conductor 92, back to the control conductor 61.

Thus energized the relay 16 moves to its circuit closing position, in which position the contact member 69 completes a holding-in circuit, which circuit maintains the relay in its closed position until interrupted by the manually operated switch 28. The contact member 70 completes the energizing circuit for trip winding 75 of switch 77, which circuit was previously set up by the upward actuation of contact member 66 of the relay 15. This circuit extends from the supply conductor 60, through conductor 99, contact member 70 of the relay 16, conductor 100, contact member 66 of the relay 15, trip winding 75, and conductor 101, back to the conductor 61.

Thus energized, the winding 75 actuates the latch 88 upwardly and allows the switch 77 to return to its open position, thus deenergizing the motor 23 and interrupting further operation of the grounding inductor 32. The operator having observed the opening of the switch 77 now manually opens the switch 28, thereby interrupting the holding circuits of both relays 15 and 16 and allowing these relays to return to their open positions. The signal device 29 is, by this operation, also deenergized, and may be reset to indicate further actuation of either of the two auxiliary relays 15 and 16, thereby placing the entire system into a condition to effect such further adjusting operations as changes in the protected circuit conditions may require.

The reactance of the grounding inductor 32 is now at a value which, although not corresponding exactly to the maximum point *d* on the curve of Fig. 2, is but slightly different therefrom, this difference being insufficient to introduce any detrimental results, or appreciably to change the tuning from the desired value corresponding to the point for ideal and most effective inductor performance.

It may here be pointed out that the relative speeds of operation of the two motors 23 and 46 must be so selected that the motor 46 can at all times properly change the magnitude of the current acting upon the winding 40 of the differential relay 36 without lagging behind the attending changes in the compensating current that result from the simultaneous adjustment in the reactance of the inductor 32 effected by the motor 23. It will be apparent that instead of varying the tap connection of the inductor 32 in the manner indicated by the showing of Fig. 1, the motor 23 may also be arranged to vary the length of an air gap in the core structure of the grounding inductor, the reactance of which is changed by variations in the reluctance of its magnetic circuit rather than by changes in the number of winding turns in the circuit. Insofar as the operation of the system of our invention is concerned therefor, the details of the inductor adjusting means will be seen to be immaterial. In fact, the system of our invention is equally applicable to all types of grounding suppressors or compensators which include, in addition to the adjustable inductor directly connected between the system neutral and ground in the manner illustrated, the equally well known compensating transformer, one familiar form of which includes a set of secondary windings connected in delta through a variable inductance choke coil. For such a construction, the motor 23, whose operation is controlled by the relay 36, would, of course, serve to vary the inductance of the choke coil.

In the event that the direction of rotation of the motor 23 is opposite to that required to change the compensating current in a direction approaching the value corresponding to the maximum amount of neutral shift, it is necessary to either reverse the direction of the motor, as by changing the position of switch 85, or otherwise provide for reversing the effect of the actuating of the differential relay 36. The motor reversing scheme comprising switch 85, shown in Fig. 1, is, therefore, typical of a wide variety of schemes for accomplishing the same purpose. In any case, in a system of the type shown in Fig. 1, it is necessary that the operator determine the proper relationship between the neutral-shift-responsive relay 36 and the reactance adjusting means whose operation is controlled thereby.

In actual operation of the system shown in Fig. 1, the sequence of events will occur in about the following order. The connection or disconnection of a section of the circuit being protected necessitates a change in the adjustment of the compensating inductor, which requirement is detected by the differential relay 36. The relay 36, in turn, causes the operation of the one or the other of the auxiliary relays 15 and 16, which operation energizes the signalling device 29 and notifies an operator of the changed condition. The operator, accordingly, closes the control switch 77 and the operations from that point on proceed automatically, assuming the switch 85 to be in the proper position to readjust the compensating inductor 32 to the desired condition. When such adjustment is completed, the push button switch 28 is depressed to place the equipment in condition for further operations of the character just described.

In the case of a system, in which a plurality of compensating inductors are utilized, it is generally preferable to cause the automatic adjusting equipment of our invention to control only one of these at any given time. If the range of the inductor thus controlled is insufficient to obtain proper adjustment for the entire system, one or more of the remaining inductors in the circuit may be adjusted a predetermined amount, or even disconnected, or an additional inductor may be connected, thereby enabling the proper adjustment to be effected by the controlled compensating inductor.

The system shown in Fig. 1 for semi-automatic adjustment of a compensating device may also be made fully automatic when modified or supplemented by the additional equipment indicated in Fig. 3. In this system, the compensating device adjusting motor 23' is disposed to rotate in one direction only, the tap changing switch device 34 actuated thereby being operated through the medium of a chain 110 driven by the motor through suitable gearing. Switch 34 is moved along the length of inductor 32 by a lug member 112, carried on chain 110, which engages the bracket device 114 formed integral with switch 34. Guide rods 116 and 117 serve to stabilize the movement of the switch, rod 116 also serving to establish an electrical connection from the switch to the ground 30. With this arrangement, it will be seen that continuous rotation of motor 23' effects a movement of switch 34 along the complete tapped length of inductor 32, first in one direction and then the other, the reversal of direction resulting when lug 112 is carried by the chain around the pulley wheels by which it is carried.

The motor 23' is controlled by means of switch 77', which is provided with a closing winding 120 and an opening winding 121. An energizing circuit for closing winding 120 is controlled by contact members 67'—127 and 71'—128, carried by auxiliary relays 15' and 16', the actuation of which relays is controlled, as in the system of Fig. 1, by differential relay 36. Likewise, an energizing circuit for the release winding 121 of the motor control switch 77' is also controlled by contact members 66 and 70 carried by the two auxiliary relays named.

Instead of the manually operable push button switch 28, which functions in the system of Fig. 1, to interrupt the holding-in circuits for the two auxiliary relays, an electrically operated relay device 28' is provided in the system of Fig. 3 for a similar purpose. The actuation of relay 28' is controlled by a time-delay relay 125, and operation of which is initiated simultaneously with the energization of the release winding of motor control switch 77'.

Intermediate the differential relay 36 and auxiliary relays 15' and 16' is disposed a control reversing device 130, which device changes its position each time the direction of movement of tap changing switch 34 reverses. In the position of device 130 shown, a movement to the left of contact member 53 of relay 36 effects, as in the system of Fig. 1, an actuation of auxiliary relay 15', a movement to the right of member 53 similarly effecting the actuation of relay 16'. When switch 34 has been moved to the upper limit of its travel, however, the contact member 132 carried thereby bridges lugs 133, thereby establishing an energizing circuit for winding 135 of control reversing device 130. As a result, contact member 137 is actuated upwardly and member 138 downwardly to effect an interchanging of the control circuits of auxiliary relays 15' and 16'. In this interchanged position, a movement to the left of contact member 53 will be seen to actuate auxiliary relay 16' instead of 15' as before, while a movement to the right similarly energizes relay 15'.

When, however, tap switch 34 has been moved to the lower limit of its travel, a second contact member 140 similarly completes a circuit for energizing winding 142 of device 130, which energization serves to return it to the position illustrated in the showing of Fig. 3. The purpose of control reversing device 130 is, as will be more completely pointed out, to always obtain a proper correlation between compensating device adjusting switch 34, when actuated by a non-reversible motor 23', and the adjustment-initiating relay 36. It In operation of the system of Fig. 3, let it be assumed that when the several pieces of equipment comprised by the system occupy the neutral or unactuated positions, illustrated, a portion of the circuit 10 being protected is disconnected or added, thereby causing the potential to ground of neutral point 13 to change. In the event that this change is in the increasing direction, the contact members of differential relay 36 will be biased to the left. Member 54, as already completely explained, actuates motor 46 in a direction to reestablish the balance of the relay, while member 53 completes an energizing circuit for the actuating winding of auxiliary relay 15'. This circuit extends from control conductor 60, through conductor 90, normally-engaged contact member 192 of a relay 190, contact member 53, conductor 91, contact member 138 of device 130, conductor 146, the winding of relay 15' and conductor 92, back to control conductor 60.

Thus energized, the winding moves the contact members of the relay upwardly to the actuated position, contact member 65 completing a holding circuit for the relay which maintains it continuously energized until the actuation of device 28', while contact member 67' completes a circuit for energizing the closing winding 120 of motor control switch 77'. This circuit extends from control conductor 60 through conductor 99', contact member 128 of relay 16', conductor 148, contact member 67' of relay 15', conductor 150, an auxiliary contact member 152 of switch 77', conductor 153, the closing winding 120, and conductor 155, back to control conductor 61.

Thus energized, winding 120 effects a movement of contact member 78 of the switch to the left to complete the energizing circuit of motor 23'. Upon the completion of the movement, auxiliary contact member 152 is moved out of engagement with its cooperating contact studs, thus interrupting the energizing circuit for winding 120. At the same time, a second auxiliary member 157 is moved into engagement with its cooperating studs, thereby setting up, although not completing, a circuit for switch opening winding 121.

Thus energized motor 23' rotates in the direction to move switch 34 upwardly along the length of inductor 32, thereby effecting an increase in compensating current.

As soon as the maximum value of neutral point shift has been exceeded, differential relay 36 will effect an actuation of its contact members to the right-hand position. Member 53 completes an energizing circuit for the actuating winding of auxiliary relay 16', which circuit extends from control conductor 60, through conductor 90, normally engaged contact member 192 of a relay 190, contact member 53, conductor 97', contact member 137 of device 130, conductor 160, the winding of relay 16', and conductor 92, back to control conductor 61.

Thus energized the winding of relay 16' moves the contact members upwardly establishing, by means of member 69, a holding-in circuit for the relay, and completing, by means of member 70, an energizing circuit for opening winding 121 of motor-control switch 77'. This circuit extends from control conductor 60, through conductor 99', contact member 70, conductor 162, closed contact member 66 of relay 15', conductors 164 and 165, auxiliary contact member 157, winding 121 of switch 77', and conductor 155, back to control conductor 61.

Thus energized, the winding 121 effects a movement to the right of contact member 78 of the motor control switch, thereby discontinuing the operation of motor 23' and stopping further adjustment of the compensating device. This energizing circuit is subsequently interrupted by auxiliary contact member 157.

Simultaneous with the release winding energization, the actuating winding of time delay relay 125 is energized, its circuit being identical with that just traced as far as conductor 165, from which point it extends through the winding of relay 125 and conductor 167, back to control conductor 61. After a time delay contact member 170 of the relay is closed to complete an energizing circuit for device 28', which circuit extends from control conductor 60 through conductor 172, contact member 170, conductor 173, the winding of device 28' and conductor 174, back to control conductor 61.

Thus energized device 28' effects an opening of its contact members, thereby interrupting the holding-in circuits for auxiliary relays 15' and 16' and allowing these relays to be returned to the unactuated positions illustrated. Such opening, of course, effects a deenergization of the circuits of both relays 125 and 28'. The equipment is now in a condition ready to effect further operation.

Assuming that such a change occurs in the protected circuit 10 as to require an adjustment of the compensating device 32 in a direction opposite to that which has just been described, the differential relay 36 will effect a movement of its contact members to the right, member 53 completing a circuit which effects the actuation of relay 16', in a manner which has already been explained. Contact member 71' of this relay now completes a circuit for energizing the winding 120 of switch 77', which circuit extends from control conductor 60, through conductor 99', contact member 71', conductor 178, contact member 127 of relay 15', conductor 150, and thence through the winding 120 to control conductor 61.

Switch 77' is, accordingly, moved to the actuated position, and the operation of motor 23' is thereby started. The direction of this operation is such that tap switch 34 is moved upwardly along the length of compensating device 32, which is the direction opposite from that required to effect proper compensation. However, when the limit of upward travel is reached, continued operation of the motor causes member 34 to start downwardly along the length of device 32, thereby causing the desired point of adjustment to be approached.

Contact member 132 carried by the switch effected, at the upper limit of switch travel, the completion of a circuit for energizing winding 135 of control-reversing device 130. This circuit extends from control conductor 60, through conductors 90 and 180, contact member 132, conductor 182, the winding 135, and conductor 184, back to control conductor 61.

Thus energized, winding 135 causes the device 130 to move the contact member 137 upwardly and member 138 downwardly, thereby reversing the control circuits for relays 15' and 16'. Such reversal is made necessary by reason of the fact that tap switch 34 is now moving in the opposite direction, and to properly control it or interrupt its operation at the desired moment, the effect of differential relay 36 upon auxiliary relays 15' and 16' must also be reversed.

Thus by means of the device 130 the impulse from differential relay 36, after the reversal of travel of compensating device switch 34, is conducted to the same auxiliary relay, so that an improper operation of the system cannot be effected. That is to say, in the particular example being considered, as soon as switch 34 starts downwardly, relay 36 moves from the neutral contact position to the left because of the decreasing compensating current. If the control circuit connections remain unchanged, this would effect the energization of auxiliary relay 15', which would interrupt further operation or compensation adjustment. However, due to the reversing action of the device 130, the impulse is instead routed to relay 16', which is already closed.

As soon as the maximum value in neutral point shift has been reached and slightly exceeded, differential relay 36 moves its contact members to the right, thereby effecting an actuation of relay 15' through a circuit which includes conductor 97', contact member 137 of device 130, and conductor 146. Both auxiliary relays 15' and 16' now being closed, the operations already explained in detail take place to effect an opening of motor-control switch 77' and the discontinuance of the compensating device adjustment.

Instead of reversing the control circuits of auxiliary relays 15' and 16', it is, of course, possible to make the arrangement such that the compensation adjusting motor 23' will have its direction of rotation reversed at the limit of travel in each direction of the tap switch 34, or other equivalent arrangements for accomplishing a similar purpose may instead be utilized.

In case of a ground fault on any of the conductors 10 of the circuit being protected, it is, of course, desirable that the compensation-adjusting system of our invention be made inoperative. One preferred manner in which this can be accomplished is illustrated in Fig. 3, in which a ground-detecting relay 190, the details of which are not shown for the sake of simplicity, is provided with a normally closed contact member 192 disposed in the relay actuation circuits controlled by the contacts of differential relay 36. Upon the occurrence of a ground fault, contact member 192 is moved to the open position, thereby preventing contact member 53 of the differential relay from sending impulses to either of the auxiliary relays 15' and 16'. In the lack of such impulses, compensating device adjustments cannot, of course, be initiated. Since normally, of course, no grounds exist on the circuit conductors, contact member 192 occupies the closed position shown, so that the adjusting system of our invention may function in the normal manner described.

Although we have shown and described certain specific embodiments of our invention, we are fully aware that many modifications thereof are possible. Our invention, therefore, is not to be restricted, except insofar as is necessitated by the prior art and by the scope of the appended claims.

We claim as our invention:

1. In combination, an alternating-current system having a neutral point, an inductive circuit for connecting said neutral point to the ground, means for adjusting the reactance of said inductive circuit, and a system of relays, influenced by the voltage between said neutral point and ground, for controlling the operation of said adjusting means, said relay system being disposed to interrupt the operation of said reactance-adjusting means as soon as the voltage from said neutral-point to ground has passed its maximum value as a result of a reactance adjustment.

2. In combination, an alternating-current system having a neutral point, a ground-compensating device for said system, means for adjusting said device, and relay means for controlling the operation of said adjusting means, said relay means being influenced by the voltage between said system neutral point and ground to interrupt the operation of said device-adjusting means as soon as said neutral point voltage passes beyond the maximum value through which an adjustment of said compensating device is capable of causing it to pass.

3. In combination, an alternating-current system having a neutral point, a ground-compensating device for said system connected between said neutral point and ground, means for adjusting the reactance of said device, and relay means for controlling the operation of said adjusting means, said relay means being influenced by the magnitude of the shift of said neutral point to interrupt the operation of said device-adjusting means as soon as the said neutral point shift goes beyond the maximum in the range of values through which adjustment of said compensating device is capable of causing it to pass.

4. In a system for adjusting a ground-compensating device utilized with an alternating-current circuit having a neutral point, the combination of relay means influenced by the voltage between said circuit neutral point and ground, and means for adjusting said compensating device, said adjusting means being controlled by said relay means to interrupt the operation of said adjusting means when said neutral point voltage, in being caused to change by an adjusting operation of said compensating device, reaches a maximum and starts to decrease.

5. In a system for controlling the adjustment of a ground-compensating device utilized with an alternating-current circuit having a neutral point, the combination of a relay that is differentially responsive to a force that varies in accordance with the voltage appearing between said neutral point and ground and to a second force the magnitude of which is adjusted by the relay to balance the first named force, adjusting means for said compensating device, and an auxiliary relay means for controlling the operation of said adjusting means, said auxiliary relay means being controlled by the said differential relay to interrupt the operation of said adjusting means when the neutral-to-ground voltage is being varied by an adjusting operation of said compensating device, and starts to decrease after reaching a maximum value.

6. In a system for supervising the adjustment of a ground-compensating device utilized with an alternating-current circuit having a neutral point, the combination of a differential relay influenced by the voltage appearing between said neutral point and ground, a pair of auxiliary relays controlled by said differential relay in a manner that one will be operated to a circuit closing position when the said neutral voltage changes in one direction and the other will be operated to a circuit closing position when the neutral voltage changes in the opposite direction, adjusting means for said compensating device, a switch for controlling the operation of said adjusting means, and means for causing said switch to be opened to interrupt the operation of said adjusting means when both of said auxiliary relays occupy their circuit closing positions.

7. A system for adjusting a ground-compensating device utilized with an alternating-current circuit having a neutral point comprising, in combination, a differential relay influenced by the voltage appearing between said neutral point and ground, a pair of auxiliary relays controlled by said differential relay, one of said relays being operated to its circuit closing position when the said neutral voltage increases, and the other being operated to its circuit closing position when the neutral voltage decreases, means, effective upon the operation of each auxiliary relay for maintaining it in its circuit closing position, a signalling device responsive to the actuation of either auxiliary relay, for indicating that an adjusting operation of the ground-compensating device is required, operating means for said compensating device, a switch for starting and stopping the operation of said operating means, and means for operating said switch to the stop position when both of said auxiliary relays have been moved to their closed positions.

8. In a system for adjusting a ground-compensating device utilized with an alternating-current circuit having a neutral point, the combination of relay means influenced by the voltage between said circuit neutral point and ground, and means for adjusting said compensating device, said adjusting means being controlled by said relay means in a manner that, when said neutral point voltage changes due to a change in the conditions of said alternating-current circuit, said adjusting means will be placed in operation, and, when the neutral point voltage, during operation of the compensating device, reaches a maximum value and starts to decrease, the said adjusting-means operation will be discontinued.

9. In a system for controlling the adjustment of a ground-compensating device utilized with an alternating-current circuit having a neutral point, the combination of a differential relay influenced by the voltage appearing between said neutral point and ground, a pair of auxiliary relays controlled by said differential relay in a manner that one will close when the said neutral voltage changes in one direction and the other will close when the neutral voltage changes in the opposite direction, adjusting means for said compensating device, a switch for controlling the operation of said adjusting means, means for causing said switch to close when either of said auxiliary relays is closed, and means for causing said switch to open when both of said auxiliary relays occupy their closed positions.

10. A system for adjusting a ground-compensating device utilized with an alternating-current circuit having a neutral point comprising, in combination, a differential relay influenced by the voltage appearing between said neutral point and ground, a pair of auxiliary relays controlled by said differential relay in a manner that one will close when the said neutral voltage increases and the other will close when the neutral voltage decreases, means, effective upon the closing of an auxiliary relay for maintaining each auxiliary relay in the closed position, adjusting means for said compensating device, a switch for controlling the operation of said adjusting means, means for causing said switch to close when either of said auxiliary relays is closed, means for causing said switch to open when both of said relays occupy their closed positions, and means, responsive to the opening of said switch, for releasing said auxiliary relays from their closed positions.

PAUL HAMEYER.
GERHART MEYER.
JOACHIM JUNGMICHL.